UNITED STATES PATENT OFFICE 2,497,163

PREPARATION OF 2(p-AMINOBENZENE-SULFONAMIDO)-PYRIMIDINE

Maurice Louis Auguste Fluchaire and Georges Louis Albert Bost, Lyon, France, assignors to Societe des Usines Chimiques Rhone-Poulenc, Paris, France, a French company No Drawing. Application April 5, 1946, Serial No. 659,872. In France April 11, 1945

7 Claims. (Cl. 260—239.75)

This invention is for improvements in or relating to sulphonamides and has for its object to provide a new and useful process for the manufacture of 2-(p-aminobenzenesulphonamido)-pyrimidine and its substitution products.

It is known that 2-(p-aminobenzenesulphonamido)-pyrimidine and its substitution products can be prepared by reacting benzenesulphonylguanidines substituted in the para-position by an amino-group, or a substituent convertible to an amino group, either with compounds containing the grouping

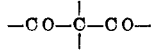

their tautomers or derivatives, or with a monoderivative of malonic dialdehyde, for example, the diethyl acetal of β-ethoxy-acrolein.

In accordance with the present invention, it has now been discovered that it is possible to prepare 2-(p-aminobenzenesulphonamido)-pyrimidine in a very good yield by condensing benzenesulphonylguanidines which are para-substituted by an amino-group, or a substituent convertible to an amino-group, with propinal, its acetal or its derivatives, condensation being followed, where necessary, by the conversion into an amino-group of the para-substituent in the benzene nucleus.

As examples of substituents capable of conversion into the amino-group the following radicals may be mentioned: acylamino-, alkylideneamino-, nitro-, nitroso-, azo-, azido- or carbonamido-.

The reaction may be carried out with or without a solvent, but preferably in the presence of condensing agents such as alkali metals or alcoholates, mineral acids, carboxylic acid anhydrides, nitrogenous bases or other similar agents.

The following examples, without being in any way limitative, illustrate how the present invention may be applied in practice. The parts referred to are parts by weight.

Example I 7.4 parts of sodium are dissolved in 320 parts of ethyl alcohol, whereupon 41 parts of p-acetylaminobenzenesulphonylguanidine and 26.6 parts of the diethyl acetal of propinal are added. The mixture is heated in an autoclave at 140–150° C. for 7 hours. After steam distillation to remove the alcohol, the reaction mixture is filtered to remove the small quantity of undissolved material present. The filtrate is neutralised with sulphuric acid and the 2-(p-acetylaminobenzenesulphonamido)-pyrimidine thereby precipitated. On deacetylation and purification, there is obtained 2-(p-aminobenzenesulphonamido)-pyrimidine, melting at 260° C.

Example II 26.6 parts of the diethyl acetal of propinal, 41 parts of p-acetylaminobenzenesulphonylguanidine and 320 parts of absolute ethyl alcohol are heated together in an autoclave to 140–150° C. for 7 hours. The alcohol is distilled off in steam and the mixture made alkaline. The small quantity of insoluble material is filtered off and the filtrate neutralised with sulphuric acid, precipitating the 2-(p-acetylaminobenzenesulphonamido)-pyrimidine. De-acetylation and purification gives 2-(p-aminobenzenesulphonamido)-pyrimidine, melting at 260° C.

We claim:

1. A process for the preparation of 2(paraaminobenzenesulphonamido)-pyrimidine which comprises reacting a para-acylaminobenzenesulphonylguanidine with the diethyl acetal of propinal and then subjecting the resulting reaction product to a deacylation treatment.

2. A process as claimed in claim 1 wherein the reaction is effected in the presence of a condensing agent consisting of an alkali alcoholate.

3. A process for the preparation of 2(paraaminobenzenesulphonamido)-pyrimidine which comprises reacting para-acetylaminobenzenesulphonylguanidine with the diethyl acetal of propinal and then subjecting the resulting reaction product to a deacetylation treatment.

4. A process as claimed in claim 3 wherein the reaction is effected in the presence of a condensing agent consisting of an alkali alcoholate.

5. A process of making 2(para-aminobenzenesulphonamido)-pyrimidine which comprises reacting para-acetylaminobenzenesulphonylguanidine with the diethyl acetal of propinal in ethyl alcohol, separating the required reaction product in the form of its p-acetyl derivative from the reaction mixture, and deacetylating that derivative.

6. A process as claimed in claim 5 wherein the reaction is effected in the presence of a condesing agent consisting of a sodium alcoholate.

7. A process as claimed in claim 5 wherein the reaction is effected at a temperature of 140° to 150° C.

MAURICE LOUIS AUGUSTE FLUCHAIRE.
GEORGES LOUIS ALBERT BOST.

(References on following page)

REFERENCES CITED

The following references are of record in the file of this patent:

UNITED STATES PATENTS

| Number | Name | Date |
|---|---|---|
| 2,435,002 | Hartmann et al. | Jan. 27, 1948 |

OTHER REFERENCES

Ganapathi et al., Proc. Ind. Acad. of Sciences, vol. 16-A, pp. 115–125 (1942).

Fieser, Organic Chemistry (D. C. Heath; Boston; 1944), pp. 221 and 222.